Patented Nov. 14, 1950

2,530,070

UNITED STATES PATENT OFFICE 2,530,070

CYCLIC SULFONE AMINES

Rupert C. Morris, Berkeley, and Alva V. Snider, Richmond, Calif., assignors to Shell Development Company, San Francisco, Calif., a corporation of Delaware No Drawing. Application April 15, 1946, Serial No. 662,402

10 Claims. (Cl. 260—247.1)

This invention relates to a novel and particularly useful class of compounds comprising the heterocyclic amines of cyclic sulfones. More particularly, the invention pertains to sulfolanyl and sulfolenyl amines wherein the sulfolanyl or sulfolenyl nucleus is attached to an amino nitrogen atom which is a member of a heterocyclic radical containing in addition to the amino-nitrogen atom, carbon and oxygen.

The novel sulfolanyl heterocyclic amines of the invention comprise a five-membered heterocyclic nucleus consisting of four nuclear carbon atoms and a sulfonyl radical which has at least one of the nuclear carbon atoms directly attached to an amino nitrogen atom which is a member of a heterocyclic radical containing in addition to the amino nitrogen atom, carbon and oxygen. The sulfolanyl heterocyclic amines may be represented by the formula

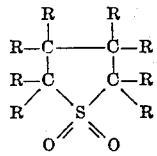

wherein at least one of the R's is a monovalent heterocyclic radical having embraced in the cycle an amino nitrogen atom, carbon and oxygen, the amino nitrogen atom having the one unsatisfied bond, and the remaining R's are members of the group consisting of the hydrogen atom and the organic radicals.

The sulfolenyl heterocyclic amines of the invention contain a five-membered heterocyclic ring consisting of four nuclear carbon atoms and a sulfonyl radical having a double bond between two vicinal nuclear carbon atoms and having at least one of the nuclear carbon atoms directly attached to an amino nitrogen atom which is a member of a heterocyclic radical containing in addition to the amino nitrogen atom, carbon and oxygen. The sulfolenyl heterocyclic amines may be represented by the formulae

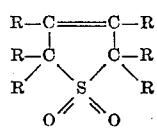

and

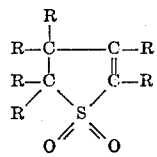

wherein at least one of the R's is a monovalent heterocyclic radical having embraced in the cycle an amino nitrogen atom, carbon and oxygen, the amino nitrogen atom having the one free bond, and the remaining R's are members of the group consisting of the hydrogen atom and the organic radicals.

A valuable group of cyclic sulfone heterocyclic amines of the invention contains a five-membered heterocyclic ring consisting of four nuclear carbon atoms and a sulfonyl radical and has one of the nuclear carbon atoms directly attached to an amino nitrogen atom which is a member of a six-membered heterocyclic ring containing in addition to the amino nitrogen atom four carbon atoms and an oxygen atom.

The organic radicals which R may represent may be cyclic or acyclic, saturated, unsaturated or aromatic, and include the alkyl, aryl, alkenyl, aralkyl, aralkenyl, alkenaryl, cycloalkyl, and cycloalkenyl radicals. Examples of organic radicals which R may represent are methyl, ethyl, propyl, isopropyl, butyl, isobutyl, sec-butyl, tert-butyl, amyl, hexyl, vinyl, allyl, methallyl, butadienyl, phenyl, cyclohexyl, 3,3,5-trimethylcyclohexyl, cyclopentadienyl, propargyl, and the like and their homologues. However, when R represents a hydrocarbon radical, it is more preferably a hydrocarbon radical of saturated character, i. e. not readily hydrogenatable, such as the alkyl, cycloalkyl, aryl, aralkyl and alkaryl radicals, the alkyl radicals being most preferred. Examples of the saturated hydrocarbon radicals include methyl, ethyl, propyl, isopropyl, butyl, isobutyl, sec-butyl, tert-butyl, cyclohexyl, cyclopropyl, phenyl, xylyl, benzyl, cresyl and 3,3,5-trimethylcyclohexyl.

The heterocyclic amino radicals which are directly attached to nuclear carbon atoms of the cyclic sulfone nucleus are those radicals which have embraced in the cycle in addition to one amino nitrogen atom, carbon and oxygen. The heterocyclic nucleus of the heterocyclic amino radicals preferably consists of oxygen, at least three carbon atoms, and in addition one amino nitrogen atom, i. e. a heterocyclic nucleus of at least five members. Moreover, the heterocyclic amino radicals may be saturated or unsaturated, but are preferably saturated. Examples of such heterocyclic amino radicals are the phenoxazine, and morpholine radicals having an unsatisfied bond on the amino nitrogen atom.

Sulfolanyl heterocyclic amines having the nuclear carbon atom in the 3-position directly attached to an amino nitrogen atom which is a member of a six-membered heterocyclic radical containing in addition to the amino nitrogen atom, four carbon atoms and an atom of oxygen, the remaining free bonds of the nuclear carbon atoms being directly attached to hydrogen atoms or alkyl radicals, possess unexpectedly valuable properties which make them of particular use in various industrial applications. A particularly useful and valuable N-(3-sulfolanyl) heterocyclic amine is N-(3-sulfolanyl) morpholine.

The numbering system of the sulfolane or sulfolene ring is indicated below:

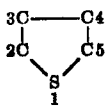

This is in accordance with the accepted system of numbering as exemplified by the compounds of this type of ring structure given on page 44 of Patterson and Capell, The Ring Index, Reinhold Publishing Corp., New York, 1940; Am. Chem. Soc. Monograph No. 84. The system may be exemplified by the compound having the structure:

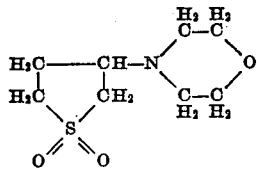

which is termed N-(3-sulfolanyl) morpholine. The compound having the structure

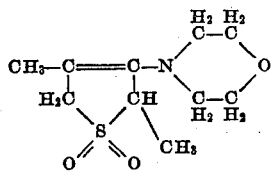

is termed N-(2,4 - dimethyl - 3 - sulfolen-3-yl) morpholine.

The heterocyclic sulfolanyl and sulfolenyl amines of the invention may be prepared by any suitable method. A particularly convenient method for the preparation of the sulfolanyl heterocyclic amines comprises reacting a sulfolene such as a 3-sulfolene or a homologue thereof with a heterocyclic amine having embraced in the heterocyclic nucleus in addition to the amino nitrogen atom and carbon and oxygen atoms. This reaction takes place in the presence of a basic-reacting substance, preferably an aqueous solution of a caustic such as sodium hydroxide, potassium hydroxide, or the like. Suitable heterocyclic amines which may be reacted are morpholine and phenoxazine.

When a heterocyclic amine is reacted with a sulfolene having the double bond between two nuclear carbon atoms, one of which is directly attached to the sulfonyl radical, an N-(3-sulfolanyl) heterocyclic amine is produced. When the heterocyclic amine is reacted with a 3-sulfolene, i. e. a sulfolene having the double bond between two nuclear carbon atoms, each of which is once removed from the sulfonyl radical, an N-(3-sulfolanyl) heterocyclic amine is also formed; for example, morpholine reacted with 2,4-dimethyl -3- sulfolene produces N-(2,4-dimethyl-3-sulfolanyl) morpholine.

The reaction of the heterocyclic amine with the sulfolene may take place at any suitable temperature, preferably at an elevated temperature above about 25° C. but below that temperature at which substantial decomposition of the reactants and/or products will result. A temperature between about 40° C. and about 100° C. has been found to be particularly effective. The reaction preferably takes place in a pressure bottle, although any other suitable apparatus may be used if desired.

A sulfolenyl heterocyclic amine may be produced by reacting sulfur dioxide with the appropriate conjugated diolefinic compound having one of the unsaturated carbon atoms linked to an amino nitrogen atom which is a member of a heterocyclic nucleus containing in addition to said nitrogen atom, carbon and oxygen. This reaction may be represented by the general equation

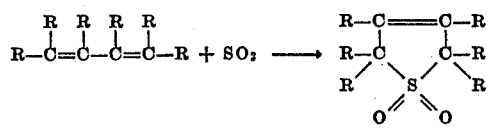

wherein at least one of the R's is a heterocyclic amino radical having embraced in the cycle an amino nitrogen atom, carbon, and in addition one oxygen atom, and the remaining R's are members of the group consisting of the hydrogen atom and the hydrocarbon radicals.

A sulfolane having more than one heterocyclic amino radical directly attached to one or more of the nuclear carbon atoms of the sulfolane nucleus, may be prepared by reacting the corresponding N-(sulfolenyl) heterocyclic amine with a heterocyclic amine under appropriate conditions.

The novel N-(sulfolanyl) and N-(sulfolenyl) heterocyclic amines of the invention find utility in a large variety of industries. For example, they may be used as insecticides, fungicides and parasiticides or as ingredients of insecticidal, fungicidal and parasiticidal compositions, and as ingredients for use in the manufacture of varnishes, polishes, and the like. Also, these novel compounds may be employed in the preparation of natural or synthetic rubbers, resins, plastics, etc. Moreover, the N-(sulfolanyl) and N-(sulfolenyl) heterocyclic amines may be further reacted, e. g. sulfurized, sulfated, or the like, to produce valuable substances to be used as addition agents in lubricating oils, greases, and as detergents, as well as for a variety of other purposes.

The N-(sulfolanyl) and N-(sulfolenyl) morpholines, and more particularly the N-(sulfolanyl) morpholines, have been found to be of outstanding value for use in wetting agents and emulsifying compounds, and as detergents.

The following examples serve to illustrate the invention.

*Example I*

In each of two pressure reactors were placed about 118 parts by weight of 3-sulfolene, approximately 700 parts by weight of morpholine, about 0.1 part by weight of potassium hydroxide and about 5 parts by weight of water. The reactors were heated at approximately 60° C. to 64° C., and on working up, about 173 parts by weight of solid was obtained. The recovered N-(3-sulfolanyl) morpholine has a melting point of 153° C.

*Example II*

Approximately 700 parts by weight of morpholine and about 146 parts by weight of 2,4-dimethyl-3-sulfolene are reacted in a pressure vessel in the presence of about 0.1 part by weight of potassium hydroxide and approximately 5 parts by weight of water, at a temperature of about 60° C. to about 65° C., to obtain N-(2,4-dimethyl-3-sulfolanyl) morpholine.

Example III

N-(4-methyl-2,4-pentadien-3-yl) morpholine is treated with approximately an equimolar amount of sulfur dioxide in the presence of pyrogallol at a temperature between about 95° C. and about 105° C. to obtain N-(2,4-dimethyl-3-sulfolen-3-yl) morpholine.

Similarly, the following novel compounds are prepared:

N-(3-sulfolanyl) phenoxazine, N-(2-sulfolanyl) morpholine, N-(3,4-dimethyl-2-sulfolanyl) morpholine, N-(3-sulfolen-3-yl) morpholine, N-(2,4-dipropyl-3-sulfolen-3-yl) phenoxazine, N-(3,4-dimethyl-3-sulfolen-2-yl) morpholine, N-(3,4-dimethyl-3-sulfolen-2-yl) phenoxazine, N-(2-sulfolen-3-yl) morpholine.

We claim as our invention:

1. A five-membered heterocyclic nucleus consisting of four nuclear carbon atoms and one sulfonyl radical and having one of the nuclear carbon atoms directly attached to the ring nitrogen atom of a six-membered heterocyclic amine nucleus containing in the cycle in addition to the said ring nitrogen atom, four atoms of carbon and one atom of oxygen, the free bonds of the nuclear carbon atoms of said heterocyclic nuclei being directly attached to members of the group consisting of hydrogen atoms and hydrocarbon radicals.

2. A five-membered heterocyclic nucleus consisting of four saturated nuclear carbon atoms and one sulfonyl radical and having one of the nuclear carbon atoms directly attached to the ring nitrogen atom of a six-membered heterocyclic amine nucleus containing in the cycle in addition to the said ring nitrogen atom, four carbon atoms and an atom of oxygen, the free bonds of the nuclear carbon atoms of said heterocyclic nuclei being directly attached to members of the group consisting of hydrogen atoms and hydrocarbon radicals.

3. A five-membered heterocyclic nucleus consisting of four nuclear carbon atoms and one sulfonyl radical and having a double bond between two nuclear carbon atoms, wherein one of the nuclear carbon atoms is directly attached to the ring nitrogen atom of a six-membered heterocyclic amine nucleus containing in the cycle in addition to said ring nitrogen atom, four carbon atoms and an atom of oxygen, the free bonds of the nuclear carbon atoms of said heterocyclic nuclei being directly attached to members of the group consisting of hydrogen atoms and hydrocarbon radicals.

4. A five-membered heterocyclic nucleus consisting of four saturated nuclear carbon atoms and one sulfonyl radical and having one of the nuclear carbon atoms directly attached to the ring nitrogen atom of a morpholine radical, the remaining free bonds of the nuclear carbon atoms being directly attached to members of the group consisting of hydrogen atoms and hydrocarbon radicals.

5. A five-membered heterocyclic nucleus consisting of four nuclear carbon atoms and one sulfonyl radical and having a double bond between the two nuclear carbon atoms once removed from the sulfonyl radical, wherein one of the nuclear carbon atoms is directly attached to the ring nitrogen atom of a morpholine radical, the remaining free bonds of the nuclear carbon atoms being directly attached to members of the group consisting of hydrogen atoms and hydrocarbon radicals.

6. N-(3-sulfolanyl) morpholine.

7. N-(2,4-dimethyl-3-sulfolanyl) morpholine.

8. N-(2,4-dimethyl-3-sulfolen 3-yl) morpholine.

9. A N-(2,4-dialkyl-3-sulfolanyl) morpholine wherein the alkyl groups contain not more than six carbon atoms.

10. A N-(dialkyl-sulfolanyl) morpholine wherein the alkyl groups and morpholine radical are each attached to a different nuclear carbon atom.

RUPERT C. MORRIS.
ALVA V. SNIDER.

REFERENCES CITED

The following references are of record in the file of this patent:

UNITED STATES PATENTS

| Number | Name | Date |
| --- | --- | --- |
| 615,488 | Knorr | Dec. 6, 1898 |
| 2,291,798 | Delfs | Aug. 4, 1942 |

OTHER REFERENCES

Journal of the American Chem. Soc., vol. 64 (1942), pp. 428–433.

Jour. Amer. Chem. Soc., vol. 66 (1944), pp. 401–403.